Feb. 17, 1970  H. EHRENS ET AL  3,495,615
DEBRISLESS TAP VALVE
Filed July 27, 1967  3 Sheets-Sheet 1
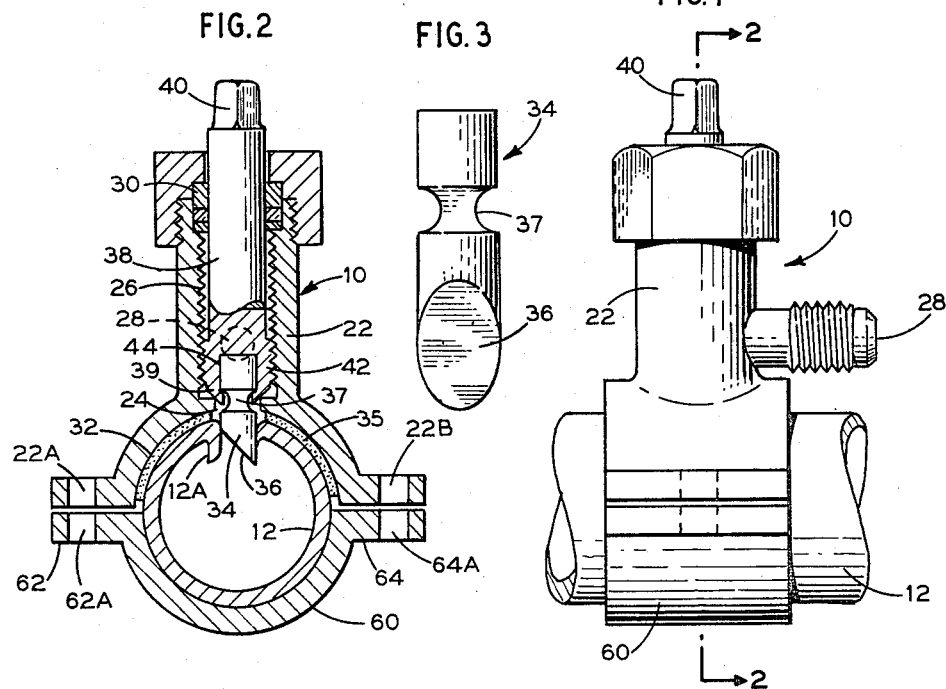
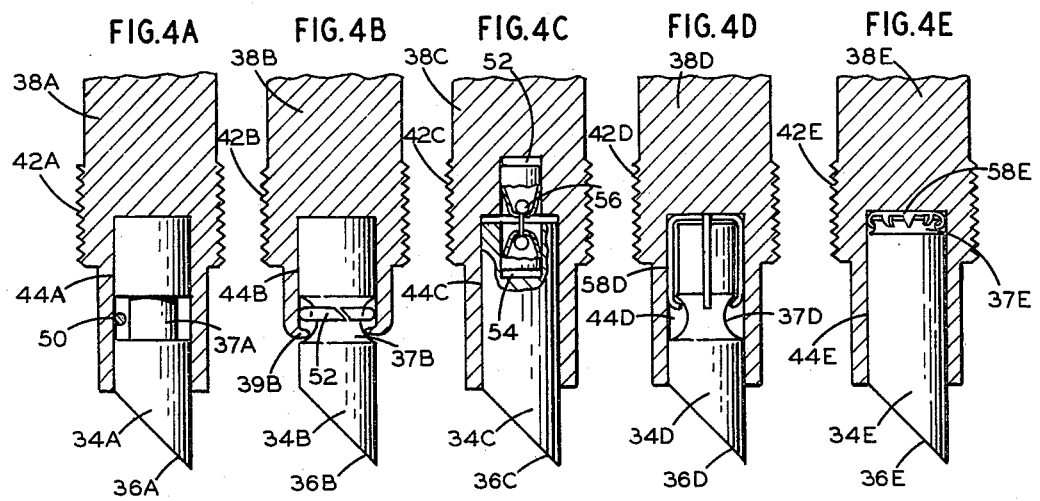
INVENTORS
Henry Ehrens
Sidney Weiner
BY Yuter & Spiesens
ATTORNEYS Feb. 17, 1970     H. EHRENS ET AL     3,495,615

DEBRISLESS TAP VALVE

Filed July 27, 1967     3 Sheets-Sheet 2

United States Patent Office 3,495,615
Patented Feb. 17, 1970

1

3,495,615
DEBRISLESS TAP VALVE
Henry Ehrens, Bayside, N.Y., and Sidney Weiner, Cresskill, N.J., assignors to Sealed Unit Parts Co., Inc., Allenwood, N.J., a corporation of New York
Filed July 27, 1967, Ser. No. 656,576
Int. Cl. F16l 55/00; B67b 7/24; F16k 51/00
U.S. Cl. 137—318         13 Claims

ABSTRACT OF THE DISCLOSURE

There is disclosed a tap valve comprising a valve body having a portion to mate with a pipeline or container to be tapped. Within the body is a valve chamber having a passageway for communication with a fluid source or sink. There is also an opening in a mating face portion of the body for communication with the pipeline or container. A threaded passageway supports a valve stem member in the body which is floatingly coupled to a piercing element. The coupling is such that axial translational motion is transmitted by the stem member to the piercing element whereas the stem member is free to rotate with respect to the piercing element. Various embodiments of the coupling are shown as well as embodiments which constrain the piercing element to a predetermined rotational position. There are also disclosed embodiments directed to the tapping of pipelines as well as sealed pressurized containers.

---

This invention pertains to tap valves, for use in tapping a pipeline or a container, generally to remove the fluid from the line or container to which it may be connected, or to inject a fluid into the line and its associated system.

In our U.S. Patent No. 3,252,474, issued May 24, 1966, we disclosed an improved line tap valve. While that valve admirably performs its desired function with certain types of pipelines (particularly refrigerant lines using copper tubing) it cerated a demand for even more versatile line tap valves (particularly those that can be used with steel pipe and the like).

Lately, there has been a demand for tapping into pipeline so that preexisting pipelines can feed new fluid utilization devices. If it were possible to shut off the flow of fluid in the preexisting pipeline the tapping would present no problems. However, in many pipeline systems it is either inconvenient or prohibitively expensive to shut down the pipeline. For example, in an illuminating gas distribution network for a residential area the main feed runs underground along a street and pipes tap off from the main feed and run underground into the homes. Generally there is a control valve in the street near the tap-off and another within the home. If for some reason, one desires to tap off from the portion of the pipe between the valves, it is necessary to dig a hole at the desired tap off point and also at the location of the street control valve. While the first hole is required for access to the line, the second hole is a nuisance and expense. If it were possible to tap into the line without shutting off the street control valve, it would not be necessary to dig the second hole.

In our copending application Ser. No. 645,924 filed June 14, 1967 for Line Tap Valve and Method for Tapping Into a Pipeline, we disclosed a valve for satisfying this demand. While that valve satisfied its requirements it created a demand for an even better valve. In particular, the aforesaid valve required the predrilling of a starter hole in the pipeline. It is highly desirable for economic reasons to delete the predrilling step. In addition, many of the previously available tap valves caused debris, resulting from the creation of the tap, to fall in the pipeline. In high velocity narrow opening pipe-

2 lines such debris can cause constrictions in the flow, blockage of fluid at inline valves downstream of the tap and other problems resulting from general debris in a pipeline.

It is accordingly a chief object of the invention to provide an improved line tap valve which can be readily and simply inserted in a pipeline while the pipeline carries fluid, without the fluid escaping.

It is another object of the invention to provide such a line tap valve which can be used with even heavy gauge steel pipe without any predrilling.

It is a further object of the invention to provide such a line tap valve which results in no debris from the tap hole entering the pipeline.

Similar problems arise in the tapping of sealed containers. For example, there have become available throwaway containers of lightweight sheet steel carrying pressurized fluids such as refrigerants. Heretofore, these containers had one pound capacities. Larger capacity containers created problems. The standard tap valves could only produce small needlelike access ports in the containers. These small ports permitted reasonable outflow rates for small containers, but for large capacity containers (10 or more pounds) the flow rates required unusually long time periods to remove the fluid. Thus, for example, to charge a large refrigerating system with ten or more pounds of refrigerant would require an unreasonably long time.

It is therefore another chief object of this invention to provide an improved container tap valve which permits faster flow rates than presently available valves.

It is another object of the invention to provide an improved container tap valve which pierces a relatively large hole in a sealed container with very slight distortion of the metal used in the container.

Briefly, the invention contemplates a tap valve for a fluid carrying member such as a pipeline or a sealed container, comprising a valve body with an engaging face which is contoured to contact matingly a portion of the fluid carrying member. There is a valve chamber in the body. A first passageway in the body provides access between the chamber and the outside of the body. An opening in the engaging face provides access between the valve chamber and the tap to be made in the fluid carrying member. The valve body movably supports a valve stem member floatingly connected to a piercing element which passes through the opening in the engaging face. By a floating connection is meant a connection whereby only translational motion of the two connected members is coupled, whereas any rotational motion of one has no effect on the other.

Other objects, the features and advantages of the invention will be apparent from the following detailed description of the invention when read with the accompanying drawings which show by way of example and not limitation, the now preferred embodiment of the invention.

In the drawings:
FIGLURE 1 shows a side view of a line tap valve connected to a pipeline in accordance with the invention;
FIGURE 2 is a sectional view of the line tap valve and pipeline taken along the line 2—2 of FIGURE 1;
FIGURE 3 is an enlarged view of the pipeline piercing element of FIGURE 2;
FIGURES 4A to 4E are enlarged views of various other embodiments of the coupling between the valve stem member and the pipeline piercing element;
FIGURE 5 is another embodiment of the line tap valve wherein the pipeline piercing element is guided to shear the pipeline in a particular orientation;
FIGURE 6 is a sectional view taken along the line 6—6 of FIGURE 5;

Figures 5, 6:
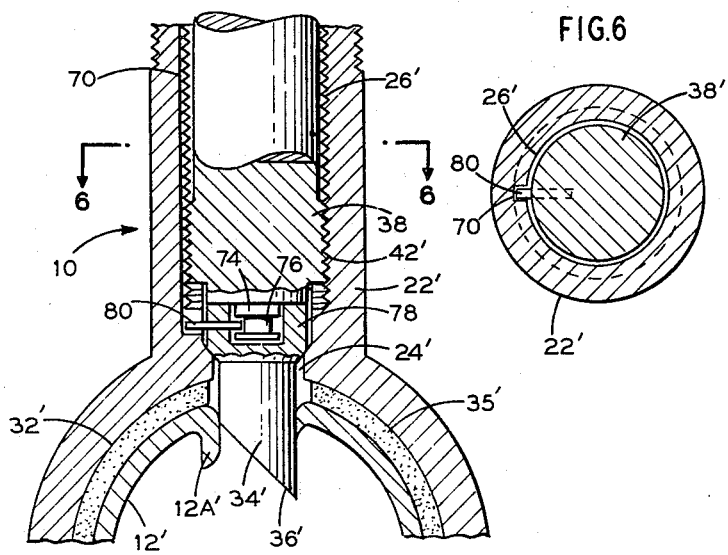

Referring to FIGURE 1, there is shown a tap valve use as line tap valve 10 connected to a pipeline 12. Before describing this fitting procedure, line tap valve 10 will be described by making reference to FIGURES 1 to 3. Valve 10 comprises a valve body 22 having a valve chamber 24, a tightly pitched valve-stem-supporting threaded passageway 26 and a fluid outlet passageway 28 communicating with valve chamber 24. Packing members 30 at the top end of passageway 26 provided a fluid seal. The bottom of valve body 22, as viewed in FIGURE 2, is provided with a pipe engaging face 32. Face 32 is contoured to mate with the outer wall of pipeline 12. Fixed to face 32 is a gasket 35 of resilient material to compensate for any mismating of the face 32 and the outer wall of pipeline 12.

The valve stem member 38 which has the function of driving pipe piercing tool or element 34 comprises: a wrench-receiving head 40; a threaded shaft 42 which meshes with valve-stem-supporting passageway 26 and a recess 44 having the shape of a cylinder to accept a portion of the element 34.

Element 34 is cylindrical in shape having an outside diameter such that it is freely rotatable in recess 44. The cutting face 36 is preferably obtained by cutting the cylinder with a plane making an acute angle with the axis of the cylinder. Thus a wedge shaped cutting tool is provided. While other shaped cutting faces can be used with soft pipelines made of copper, the wedge shaped cutting face has many properties which are desirable for cutting steel pipe as will hereinafter become apparent. Since the cutting face is a wedge it should be apparent that the desired angle is obtained by trading off required applied force for cutting and travel distance. The less the required applied cutting force, the sharper the angle but the greater travel distance; and the less travel distance the broader the angle but the more required applied cutting force.

Because the element 34 also acts as the valving member, as will hereinafter become apparent, its axial travel must follow the axial travel of stem member 38. Accordingly, means must be provided to interengage element 34 and stem member 38 such that they can have free relative rotation but common axial translation. In FIGURES 2 and 3 this means is obtained by providing a peripheral groove near the top of element 34. After element 34 is placed in recess 44 of stem member 38, the peripheral edge 39 is rolled over to slidable fit in groove 37. Thus element 34 is freely rotatable with respect to stem member 38 and vice versa, while stem member 38 axially drives element 34. It should be noted that element 34 should bottom in recess 44 before edge 39 engages the wall of groove 37 during inward (downward) travel of stem member 38 in the cutting operation.

Although the engaging means shown in FIGURES 2 and 3 is presently preferred, FIGURES 4A to 4E show various other types of engaging means. Since many of the elements are the same as those described with respect to FIGURES 2 to 3, like elements are designated by the same reference number with a different letter suffix and only the differences will be described in detail.

In particular, in FIGURE 4A a pin 50 is used to engage the peripheral groove 37A of element 34. The pin is fitted into a pair of holes drilled in the portion of stem member 38A surrounding recess 44A. In FIGURE 4B the rolled over peripheral edge 39B of stem member 38B engages a split ring washer 52 snap fitted about groove 37B of element 34B. In FIGURE 4C, a further recess 52 is provided in the recess 44C of stem member 38C and an opposed recess 54 is provided in the top of element 34C. Force fitted into each of these recesses are the ends of a short length of bead chain 56. Both FIGURES 4D and 4E show the engaging means as gripper elements 58D and 58E respectively which are force fitted into the recesses 44D and 44E of stem members 38D and 38E, respectively. The teeth of the gripper elements 58D and 58E slidably engage the peripheral grooves 37D and 37E of elements 34D and 34E, respectively.

The valve body 22 is mounted on pipeline 12 through the agency of strap 60. Strap 60 is preferably contoured to mate with pipeline 12. The ends 62 and 64 are flat and provided with holes 62A and 64A to mate with holes 22A and 22B in flattened portions of valve body 22. Bolts (not shown) pass through these holes to fix the valve 10 to the pipeline 12.

When line tap valve 10 is to be mounted on pipeline 12, valve stem member 38 is retracted so that piercing element 34 does not extend beyond the bottom of washer 35. A mechanic places face 32 of valve body 22 against pipeline 12 and aligns it at the desired position. Then strap 60 is connected onto valve body 22 by the nuts and bolts (not shown). The nuts are tightened so that gasket 12 seals the interface between the outer wall of pipeline 12 and the face 32 of valve body 22. A wrench (not shown) is applied to head 40 and valve stem 38 is propelled downward. As piercing element 34 is driven through the wall of pipeline 12 a shear and folding force is applied thereto, creating a flap 12A which is still integral with the pipeline. Consequently no metallic debris enters the pipeline. It should be noted that when element 34 completely pierces the pipeline wall, the valve is closed.

When the valve is to be opened, valve stem 38 is retracted until element 34 is in valve chamber 24. At that time, there is unobstructed passage between pipeline 12 and passageway 28, via valve chamber 24.

It should be noted that element 34 and pipeline 12 cooperate to provide the valving seat. However, it is also possible to provide a separate valving seat in valve body 22.

In the valves so far described it should be realized that the direction in which the flap 12A extends into the channel of the pipeline 12 is completely random. While this randomness is not deleterious in many applications, there are some instances where a minimum obstruction is required in the flow. In such cases the direction of the flap should be controlled so that its plane is parallel to fluid flow. Accordingly, FIGURE 5 shows an embodiment wherein the flap is cut in a predetermined direction.

Again, since many elements are the same as those previously described, primed reference numbers are used for like elements and only the differences will be described in detail. In particular, threaded passageway 26' of valve 10' is provided with a groove 70 which is parallel to the axis of the passageway. The base of stem member 38' instead of having a recess for accepting element 34' is provided with a boss 74 having a peripheral groove 76. The top of element 34' has a collar 78 which rotatably encompasses boss 74. A pin 80 passes through a hole in collar 78 and engages the groove 76. Thus pin 80 is axially slidable along groove 70 in passageway 26'. Initially, when assembling the subcombination of piercing element 34' and stem member 38' into valve body 22', pin 80 is aligned in groove 70 and the assembly then driven axially downward. Therefore, element 34' maintains a constant predetermined angular position, since pin 80 in groove 70 prevents any rotation of element 34'. In addition, pin 80 cooperating with groove 76 constrains element 34' to follow the axial retraction of member 38'.

Figure 7:
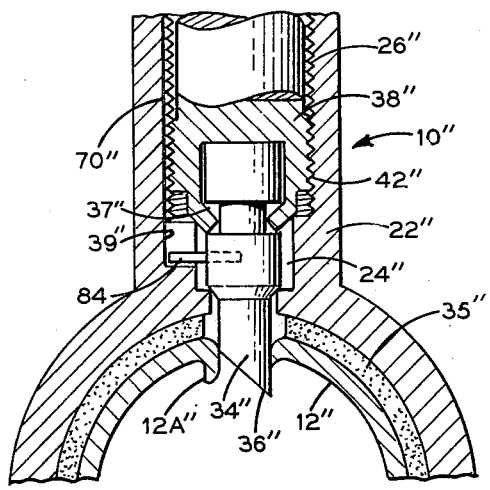
FIGURE 7 is an alternate embodiment of the line tap valve of FIGURE 6.

FIGURE 7 shows a variation of this concept. Therefore, double primed reference characters are used to denote like elements and only the differences will be discussed. Here pin 84 is fixed to element 34'' which is similar to element 34 of FIGURE 2 and the axial translation constraint is again provided by groove 37'' cooperating with rolled over portion 39'' of stem member 38''.

Thus there has been shown an improved line tap valve employing a floating piercing element for tapping a line while the line carries fluid without any leakage of fluid or introduction of debris in the line. In a simple operation, the line is tapped and a valve fitted into the line.

Figure 8:
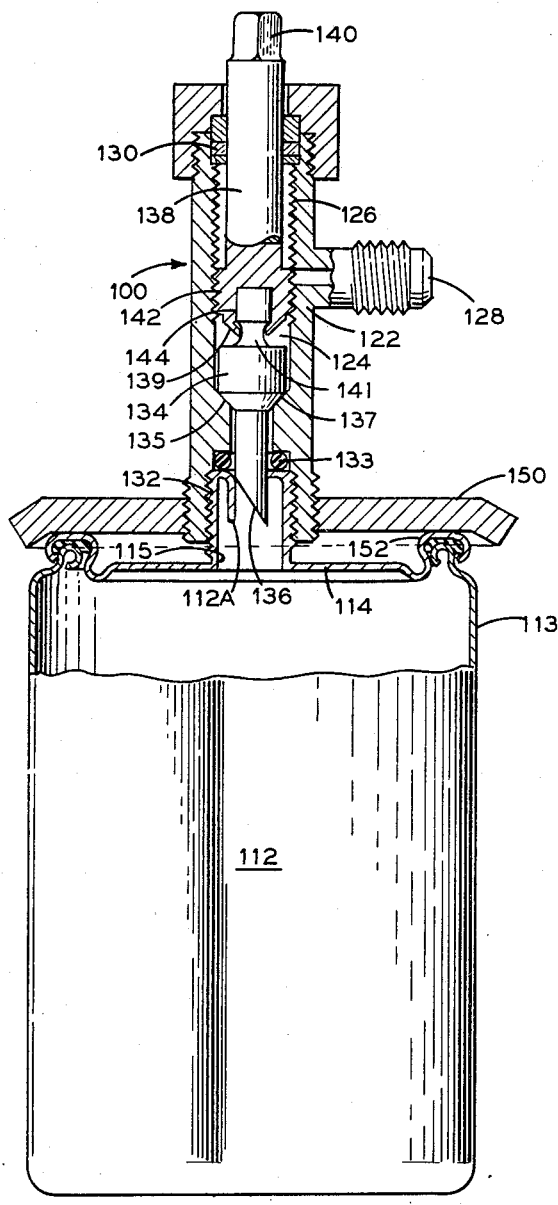
FIGURE 8 is a sectional view of a container tap valve connected to a throwaway container in accordance with the invention.

In FIGURE 8 the tap valve is shown as container tap valve 100 connected to container 112. Container 112 comprises a body 113 (shown reduced in size) and top 114, each of sheet steel. When used for storing refrigerant, the refrigerant is loaded into the body in a liquid state at very low temperature. The top 114 is then crimped onto the body at crimping ridge 152 in the usual manner. The top 114 includes an integral, threaded boss 115. Thus the container is sealed to contain refrigerant which when warmed up is pressurized fluid. These containers are then shipped to users who connect the container tap valve 100 thereto.

Valve 100 comprises a valve body 122 having a valve chamber 124, a tightly pitched valve-stem-supporting threaded passageway 126 and a fluid outlet passageway 128 communicating with valve chamber 124. Packing members 130 at the top end of passageway 126 provide a fluid seal. The bottom of valve body 122, as viewed in FIGURE 8, is provided with a container engaging face 132. Face 132 is a threaded cylindrical recess which mates with the threads of boss 115. In the base of the recess of face 132 is an O-ring 133 of resilient material to provide a seal and to compensate for any mismating of the face 132 and the top periphery of boss 115.

The valve stem member 138 which has the function of driving piercing tool or element 134 comprises: a wrench-receiving head 140; a threaded shaft 142 which meshes with valve-stem-supporting passageway 126 and a recess 144 having the shape of a cylinder to accept a portion of the element 134.

Element 134 is cylindrical in shape having an outside diameter such that it is freely rotatable in recess 144. The cutting face 136 is similar to the previously described cutting faces.

Because the element 134 also acts as the valving member, in view of the shoulder 135 cooperating with seat 137 in body 122, its axial travel must follow the axial travel of stem member 138. Accordingly, means must be provided to interengage element 134 and stem member 138 such that they can have free relative rotation but common axial translation. In FIGURE 8 this means is obtained by providing a peripheral groove 141 near the top of element 134. After element 134 is placed in recess 144 of stem member 138, the peripheral edge 139 is rolled over to slidably fit in groove 141. Thus element 134 is freely rotatable with respect to stem member 138 and vice versa, while stem member 138 axially drives element 134. It should be noted that element 134 should bottom in recess 144 before edge 139 engages the wall of groove 141 during inward (downward) travel of stem member 138 in the cutting operation.

Although the engaging means shown in FIGURE 8 is presently preferred the engaging means of FIGURES 4A to 4E and 6 and 7 can also be used.

In operation, the lock nut 150 is repelled as is the valve stem 138. Valve 100 is then threaded on boss 115 and nut 150 propelled to engage the crimp ridge 152 for preventing binding distortion of the boss 115. Valve stem 138 is then propelled causing the piercing face 136 to cut a flap 112A in the top of boss 115. Thus a large hole is obtained with only slight distortion of the light weight sheet steel and without creating any fouling debris. When valve stem 138 is in its maximum downward position, shoulder 135 rests on seat 137 and the valve is closed. To open the valve and allow pressurized fluid to flow from container 112 to passageway 128 it is only necessary to repel valve stem 138. When the contents of container 112 are completely spent valve 110 can be unscrewed from boss 115 and the container can be thrown away.

These has thus been shown an improved container tap valve, ideally suited for use with large capacity throw-away containers, wherein the use of a floating piercing tool permits the creation of large outflow holes therein without distortion of the light weight sheet steel of the container.

What is claimed is:

1. A tap valve for use with a fluid carrying member comprising a valve body having an engaging face provided with an opening and contoured to rest matingly with a portion of the fluid carrying member and be connected thereto, a valve chamber in said body, a fluid passageway in said valve body communicating with said valve chamber, a threaded passageway in said valve body communicating with said valve chamber, a valve stem member movably supported by said valve body and in threaded engagement with said threaded passageway whereby a rotation of said valve stem member effects axial movement of said valve stem member relative to said valve body, a piercing element passable through the opening in said engaging face, and means for connecting said piercing element to said valve stem member so that said piercing element is freely rotatable with respect thereto whereby only the axial movement of said valve stem member is transmitted to said piercing element, said piercing element comprising a cylindrical member having an angularly truncated end remote from said valve stem member to provide a wedge shaped cutting edge.

2. The tap valve of claim 1 wherein said piercing element comprises a member having a cylindrical portion, said cylindrical portion being provided with a circumferential groove and further comprising means connected to said valve stem member for fitting into said groove to simultaneously permit rotation of said valve stem member with respect to said piercing element and restrict relative axial movement of both.

3. The tap valve of claim 1 wherein the end of said valve stem member opposite said piercing element is provided with a cylindrical cavity and said piercing element is a member having a cylindrical portion rotatably fitted in said cylindrical cavity.

4. The tap valve of claim 3 wherein the end of said piercing element adjacent said valve stem member being provided with a peripheral groove, and means connected to said valve stem member for slidably engaging the region of said peripheral groove.

5. The tap valve of claim 4 wherein said engaging means comprises a rolled over lip at the peripheral edge of the cylindrical cavity of said valve stem member.

6. The tap valve of claim 5 further comprising a split ring washer about said peripheral groove.

7. The tap valve of claim 4 wherein said engaging means comprises a gripper means frictionally fitted in said cylindrical cavity, said gripper means having teeth for engaging said peripheral groove.

8. The tap valve of claim 4 wherein a portion of said valve stem member in the region of said cylindrical cavity is provided with an opening facing said cavity and said engaging means comprises a pin means seated in said opening and lying in said peripheral groove.

9. The tap valve of claim 1 further comprising means for maintaining said piercing element in a predetermined angular position regardless of the movement of said valve stem member.

10. The tap valve of claim 1 wherein the wall of said threaded passageway is provided with a longitudinal groove and said piercing element is provided with a pin for slidingly fitting in said longitudinal groove whereby during the axial and rotational movement of said valve stem member and the axial movement of said piercing element the latter is constrained to a fixed rotational position.

11. The tap valve of claim 1 for use with a pipeline wherein said engaging face is substantially cylindrically concave and further comprising gasket means connected to at least a portion of said engaging face.

12. The tap valve of claim 1 for use with a container having a threaded boss wherein said engaging face is a threaded cylindrical recess for accommodating said threaded boss.

13. A tap valve as in claim 1, in which said cutting edge extends substantially across the diameter of said cylindrical member.

References Cited

UNITED STATES PATENTS

| | | | |
|---|---|---|---|
| 1,392,411 | 10/1921 | Gavin | 251—86 |
| 1,414,357 | 5/1922 | Harris | 251—284 X |
| 2,147,332 | 2/1939 | Cornelius | 251—86 |
| 2,608,989 | 9/1952 | McDonald | 137—318 |
| 2,827,913 | 3/1958 | Wagner | 137—318 |
| 3,001,545 | 9/1961 | Ziege | 251—86 |
| 3,162,211 | 12/1964 | Barusch | 137—318 |
| 3,222,027 | 12/1965 | Gilleeny | 251—88 X |

FOREIGN PATENTS

| | | |
|---|---|---|
| 138,041 | 1/1920 | Great Britain. |
| 223,243 | 7/1959 | Australia. |

WILLIAM F. O'DEA, Primary Examiner

DAVID R. MATTHEWS, Assistant Examiner

U.S. Cl. X.R.

222—81